Sept. 17, 1957　　　J. J. PARKER ET AL　　　2,806,705
CHUCK FOR SUPPORTING A PLURALITY OF WORK PIECES
Filed June 25, 1956
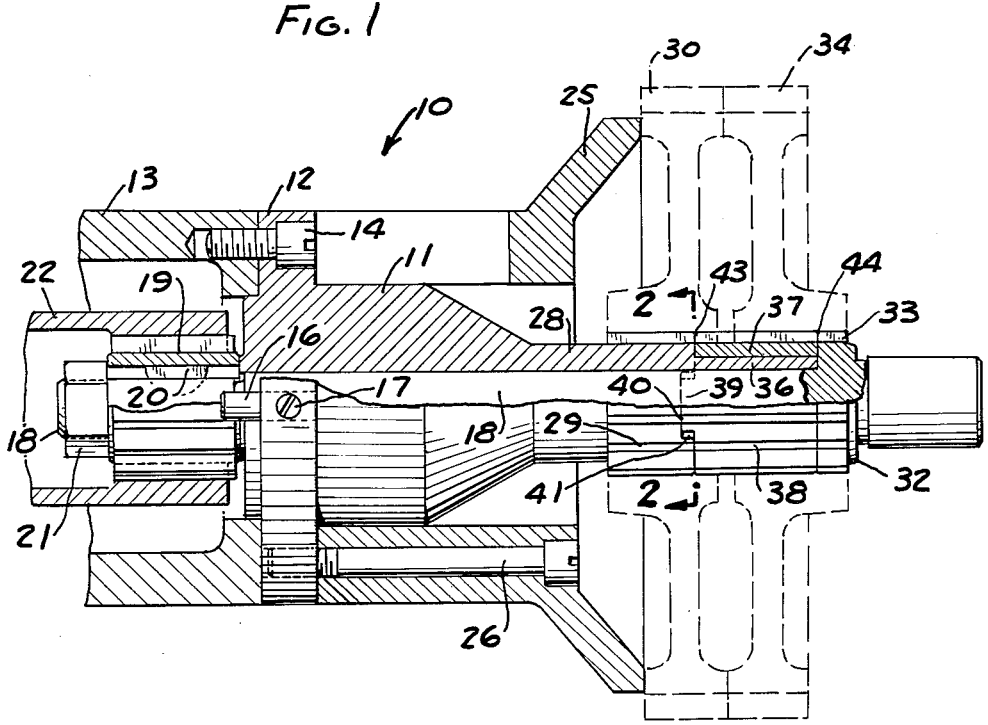
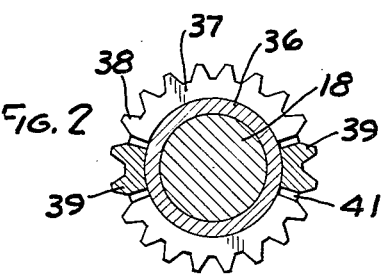
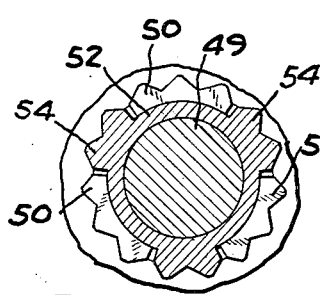
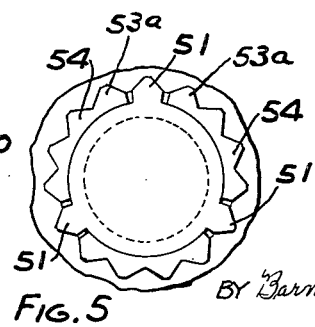
INVENTORS
JOHN J. PARKER &
LONDON T. MORAWSKI
ATTORNEYS.

United States Patent Office 2,806,705
Patented Sept. 17, 1957

2,806,705

CHUCK FOR SUPPORTING A PLURALITY OF WORK PIECES

John J. Parker and London T. Morawski, Detroit, Mich.

Application June 25, 1956, Serial No. 593,690

5 Claims. (Cl. 279—2)

This invention relates to chucks, especially those used in connection with machine tools.

An object of the invention is to provide a simple, inexpensive, easily operable chuck structure for holding a plurality of work pieces during machining operations and the like.

The invention generally contemplates providing the chuck body and a rotatable shaft thereon with axially spaced sets of teeth and interposing a freely rotatable toothed ring between the sets of teeth so that one work piece mounted on the chuck engages the body teeth and the ring teeth while another work piece engages the ring teeth and shaft teeth. The work pieces are locked on the chuck and released by rocking the shaft relatively to the chuck body. One form of the invention is shown in the accompanying drawings.

Fig. 1 is a generally sectional view of a chuck according to this invention.

Fig. 2 is a sectional view on line 2—2 of Fig. 1.

Fig. 3 is a fragmentary, partly sectional view of a modified form of the work piece holder structure.

Fig. 4 is a sectional view on line 4—4 of Fig. 3.

Fig. 5 is an end view of the modified form taken toward the left in Fig. 3.

Shown in Fig. 1 is a chuck 10 having a body 11 with a radial flange 12 adapted to be secured to a support 13 such as on a machine tool by means of cap screws 14. Flange 12 may have one or more positioning dowels 16 fixed in place by set screws 17.

A shaft 18 extends rotatably through body 11. A pinion 19 is non-rotatably keyed to one end of the shaft as at 20 and is secured on the shaft by such means as a nut 21. Pinion 19 is adapted to be engaged by a toothed actuator such as shown at 22. A work piece locator 25 is fixed on body 11 by cap screws 26 engaged with body flange 12.

Body 11 has an axial extension 28 provided with teeth 29 for dentally engaging and supporting a work piece 30 such as that shown in phantom in Fig. 1. An end portion 32 of shaft 18 is provided with teeth 33 for dentally engaging and supporting another work piece shown in phantom at 34. The sets of teeth 29 and 33 are axially spaced by a sleeve 36 around shaft 18. Sleeve 36 may be integral with body extension 28 as shown. A ring 37 is mounted around sleeve 36 and has teeth 38 for dentally engaging work pieces 30 and 34. Ring 37 has an axial extension 39 which projects into a somewhat larger recess 40 in toothed portion 29 of body extension 28. Sleeve 37 is freely rotatable relatively to toothed portions 29 and 33 of the body and shaft within the limits of the circumferential clearance 41 between projection 39 and recess 40.

In use it may be assumed that chuck body 12 has been mounted on a support 13 associated with a machine tool and that pinion 19 on shaft 18 has been connected to actuator 22 as described. A work piece 30 is slipped axially over the outer end portion 32 of shaft 18, over ring 37 and toothed portion 29 of the chuck body and is abutted against work piece locator 25. Locator 25 is arranged to locate work piece 30 so that it bridges the juncture 43 between toothed portion 29 of the body and ring 37.

A second work piece 34 is then slipped over the outer end of the shaft and brought into abutment against work piece 30. Work piece 34 bridges the juncture 44 between ring 37 and toothed portion 33 of shaft 18. Engagement of axial projection 39 and recess 40 keeps the teeth on ring 37 generally rotationally aligned with the teeth on the shaft and body to facilitate mounting the work pieces on the chuck. Work piece 30 is thus dentally engaged and supported by the body teeth 29 and ring teeth 38 while work piece 34 is dentally engaged and supported by ring teeth 38 and shaft teeth 33.

Pinion 19 is rotated by actuator 22 to turn shaft teeth 33 relatively to body teeth 29. Teeth 33 turn outer work piece 34 which in turn rotates ring 37. Ring 37 turns inner work piece 30 until its teeth are brought into locking engagement against teeth 29 fixed on the chuck body. This stops the movement of ring 37, and teeth 33 lockingly engage the teeth on work piece 34. Both work pieces are thus securely fixed on the chuck so that machining operations can be performed on both of them.

To release the work pieces, the turning force of actuator 22 on pinion 19 is released to permit shaft 18 to rock for relieving the gripping force of teeth 33 and 38 on work piece 34. Ring 37 is then free to rock for relieving the gripping force of teeth 38 and 29 on inner work piece 30. The work pieces may be slipped axially off of the toothed work piece holders and removed over the outer end of shaft 18. Other work pieces may be mounted and locked on the chuck and released and removed in the manner described.

While the drawings illustrate a chuck with a single intermediate toothed ring 37, it is contemplated that a plurality of toothed rings may be interposed between toothed portions 29 and 33 of the chuck body and shaft for holding a greater number of work pieces.

The modified form of the invention shown in Figs. 3–5 is similar to the principal form except that it is adapted for holding axially relatively thin work pieces. Body extension 48 and shaft 49 are provided respectively with circumferentially spaced sets of teeth 50 and 51. Ring 52 has axially stepped construction with narrow portions 53 disposed between the sets of teeth 50 and 51 on the body and shaft, intermediate portions 53a positioned in extension of some of body teeth 50, and axially broad portions 54 between the sets of body teeth 50.

An inner work piece 55 positioned against locator 56 is engaged by body teeth 50 and by teeth on the broader portions 54 of ring 52. An outer work piece 57 is engaged by shaft teeth 51 and the ring teeth at narrow portions 53, intermediate portions 53a and broad portions 54. This construction provides engagement of the toothed holder elements with a work piece over a sufficient area to insure that relatively thin work pieces will be tightly clamped on the chuck without danger of damage thereto. Use and operation of this form of the invention is similar to use and operation of the principal form.

We claim:

1. A chuck for holding a plurality of work pieces comprising, a body adapted to be mounted on a support such as a machine tool, shaft means on said body, said body and shaft means having toothed portions, said shaft means being rotatable relatively to said body so that said toothed portions can be rocked relatively to each other, a toothed element secured between said toothed portions of said body and said shaft means, said toothed element being generally freely rotatable relatively to said body and shaft means, said toothed portion of said body and said toothed element being cooperable to dentally engage and support a toothed work piece with which said chuck is adapted to be used, said toothed portion of said shaft means and said toothed element being cooperable to dentally engage and support another such work piece while the first-mentioned work piece is supported on said chuck as described, whereby to selectively lock the work pieces on said chuck and release them by rocking said shaft means relatively to said body.

2. A chuck for holding a plurality of work pieces comprising, a body adapted to be mounted on a support such as a machine tool, shaft means on said body, said body and shaft means having toothed portions forming first and second work piece holders respectively, said holders being generally axially aligned, said shaft means being rotatable relatively to said body so that said holders can be rocked relatively to each other, a third toothed work piece holder secured between and in generally axial alignment with said first and second holders, said third holder being generally freely rotatable relatively to said first and second holders, said holders having a combined axial extent adequate for dentally engaging and providing support for a plurality of toothed work pieces with which said chuck is adapted to be used, locator means on said body for positioning a first work piece so that it bridges the juncture between and engages said first and third holders and for positioning another work piece so that it bridges the juncture between and engages said third and second holders, whereby to selectively lock the work pieces on said chuck and release them by rocking said shaft means relatively to said body.

3. A chuck for holding two work pieces comprising, a body adapted to be mounted on a support such as a machine tool, shaft means on said body, said body and shaft means having toothed portions forming first and second work piece holders respectively, said holders being generally axially aligned, said shaft means being rotatable relatively to said body so that said holders can be rocked relatively to each other, a sleeve secured between said first and second holders, said sleeve being generally freely rotatable relatively to said shaft and body means, said sleeve being toothed to form a third work piece holder, said holders having substantially the same diameter for engaging generally similar toothed work pieces, means forming a work piece locator on said body, said holders having a combined axial extent adequate for dentally engaging and providing support for two toothed work pieces with which said chuck is adapted to be used, said locator being operative to position a first work piece so that it bridges the juncture between and engages said first and third holders and so that a second work piece abutted against the first bridges the juncture between and engages said third and second holders, whereby to selectively lock both of the work pieces on said chuck and release them by rocking said shaft means relatively to said body.

4. A chuck for holding two axially relatively thin work pieces comprising, a body adapted to be mounted on a support such as a machine tool, shaft means on said body, said body and said shaft means each having a plurality of circumferentially spaced toothed portions for engaging and supporting toothed work pieces, said shaft means being rotatable relatively to said body so that said toothed portions can be rocked relatively to each other, a toothed ring, said ring being generally freely rotatable relatively to said body and shaft means, said ring having axially narrow portions disposed axially between said toothed portions of said body and shaft means so that when two axially abutted toothed work pieces are mounted on said chuck one of the work pieces can engage said toothed portions of said body and the other work piece can engage said toothed portions of said shaft means, said ring having axially broader portions between said narrow portions for engaging the work pieces, whereby to selectively lock the work pieces on said chuck and release them by rocking said shaft means relatively to said body.

5. The chuck defined in claim 4 wherein said axially narrow portions of said ring are toothed for engaging work pieces.

References Cited in the file of this patent

UNITED STATES PATENTS

| | | |
|---|---|---|
| 2,681,805 | Parker et al | June 22, 1954 |
| 2,762,629 | Dalby | Sept. 11, 1956 |